(12) United States Patent
Lykkegaard (10) Patent No.: US 10,377,582 B2
(45) Date of Patent: Aug. 13, 2019

(54) LINE SORTER (71) Applicant: BEUMER Group A/S, Aarhus N (DK)

(72) Inventor: Uffe Lykkegaard, Aarhus C (DK)

(73) Assignee: Beumer Group A/S, Aarhus N (DK)

(*) Notice: Subject to any disclaimer, the term of this patent is extended or adjusted under 35 U.S.C. 154(b) by 0 days.

(21) Appl. No.: 15/736,131

(22) PCT Filed: Jun. 22, 2016

(86) PCT No.: PCT/DK2016/050207
§ 371 (c)(1),
(2) Date: Dec. 13, 2017

(87) PCT Pub. No.: WO2016/206695
PCT Pub. Date: Dec. 29, 2016

(65) Prior Publication Data
US 2018/0170690 A1 Jun. 21, 2018

(30) Foreign Application Priority Data

Jun. 24, 2015 (DK) .................. 2015 70389

(51) Int. Cl.
B65G 47/94 (2006.01)
B65G 23/23 (2006.01)
(Continued)

(52) U.S. Cl.
CPC .............. *B65G 47/94* (2013.01); *B65G 17/06* (2013.01); *B65G 23/23* (2013.01); *B65G 47/54* (2013.01); *B65G 47/96* (2013.01); *B65G 54/02* (2013.01)

(58) Field of Classification Search
CPC ........ B65G 47/94; B65G 17/06; B65G 47/54; B65G 54/02; B65G 23/23; B65G 17/005;
(Continued)

(56) References Cited

U.S. PATENT DOCUMENTS 5,054,601 A * 10/1991 Sjogren .................. B65G 23/23
198/370.04
6,478,138 B1 * 11/2002 Edwards .............. B65G 17/345
198/370.06
(Continued)

FOREIGN PATENT DOCUMENTS

DE 10 2007 047 000 A1 4/2009
DE 102012000665 A1 8/2012
(Continued)

OTHER PUBLICATIONS

International Search Report and Written Opinion of the International Searching Authority issued in related PCT/DK2016/050207 dated Sep. 5, 2016.
(Continued)

*Primary Examiner* — Mark A Deuble
(74) *Attorney, Agent, or Firm* — Woodard, Emhardt, Henry, Reeves & Wagner, LLC (57) ABSTRACT The invention relates to a line sorter for sorting items of various shapes, sizes and weights, in particular postal parcels or airport baggage. The invention is particularly related to the propulsion system (304, 306, 406) for the sorter. It may be seen as an object of the invention to provide a line sorter with a reduced need for energy input at a given sorting capacity. It is disclosed that a closed loop chain including sorting carts or slats (302) is provided with couplings (312) and is provided for moving along line sorter track sections. The linear synchronous motor propulsion system is provided for moving said closed loop chain, and a gap between adjacent permanent magnets (306) is the same or substantially the same between each of the permanent magnets.

17 Claims, 5 Drawing Sheets (51) Int. Cl.
*B65G 17/06* (2006.01)
*B65G 47/96* (2006.01)
*B65G 54/02* (2006.01)
*B65G 47/54* (2006.01)

(58) Field of Classification Search
CPC ........ B65G 47/53; B65G 47/64; B65G 47/46; B65G 47/48; B65G 47/50; B65G 47/95; B65G 47/98; B65G 47/49
See application file for complete search history.

(56) References Cited

U.S. PATENT DOCUMENTS

| | | | |
|---|---|---|---|
| 6,669,012 B1 | 12/2003 | Yoshida et al. | |
| 6,854,584 B2 | 2/2005 | Henson et al. | |
| 6,938,750 B2 * | 9/2005 | Miller | B65G 17/345 198/370.04 |
| 8,381,897 B2 | 2/2013 | Brunsen et al. | |
| 9,033,140 B2 | 5/2015 | Studer | |
| 9,056,720 B2 | 6/2015 | van de Loecht et al. | |
| 9,708,128 B2 * | 7/2017 | Parodi | B65G 47/96 |
| 2002/0017537 A1 * | 2/2002 | Barklin | B65G 17/345 222/240 |
| 2002/0096417 A1 * | 7/2002 | Veit | B07C 5/362 198/370.02 |
| 2003/0221935 A1 | 12/2003 | Barklin et al. | |
| 2006/0011093 A1 * | 1/2006 | Jensen | B60L 13/04 104/282 |
| 2010/0213031 A1 | 8/2010 | Krech et al. | |
| 2016/0046453 A1 * | 2/2016 | Fujio | B65G 47/962 198/469.1 |
| 2017/0057751 A1 * | 3/2017 | Fujihara | B65G 47/22 |

FOREIGN PATENT DOCUMENTS

| | | |
|---|---|---|
| DE | 10 2012 200 951 A1 | 7/2013 |
| EP | 1 422 173 B1 | 12/2006 |
| EP | 1 747 844 B1 | 8/2008 |
| EP | 2115396 B1 | 3/2013 |
| EP | 2 709 249 A1 | 3/2014 |
| JP | 2005298126 A | 10/2005 |
| JP | 2005044936 A | 2/2006 |
| WO | WO 00/32502 A1 | 6/2000 |
| WO | WO 2009/141077 A1 | 11/2009 |
| WO | WO 2012/088615 A2 | 7/2012 |
| WO | WO-2014157640 A1 * | 10/2014 ........... B65G 47/962 |

OTHER PUBLICATIONS

Machine translation of DE12012000665A1 by Lexis Nexis Totai Patent on Dec. 13, 2017.
Machine translation of EP2115396B1 by Lexis Nexis Total Patent on Dec. 13, 2017.
Machine translation of JP2005298126A by Lexis Nexis Total Patent on Dec. 13, 2017.
Machine translationf JP2006044936A by Lexis Next's Total Patent on Dec. 13, 2017.

* cited by examiner

LINE SORTER

FIELD OF THE INVENTION

The invention relates to a line sorter for sorting items of various shapes, sizes and weights, in particular postal parcels or airport baggage. The invention is particularly related to a propulsion system for moving parts of the sorter and how to implement this in a most effective manner.

BACKGROUND OF THE INVENTION

A sorter is a device able to sort items according to their identification and by loading or inducting the items onto the sorter and unloading, i.e. discharging them, at a discharge in accordance with the identification and thus into one or more discharges dedicated the items.

Sorters of the type as the present invention are typically suited for sorting several thousands of items per hour. Thus, e.g. a substantial amount of energy may be used by the system and some acoustic noise may also be generated. Furthermore, due to a need for high performance, e.g. in terms of number of sorted items per hour, but also including a need for extreme reliability, each part of the system must be engineered to suit these needs, while limiting the used amount of energy and the generated acoustic noise when operating the system.

Some line sorter systems may have had a high reliability, but may then have been in need of a high amount of energy to operate. Other systems may have needed a low amount of energy to operate, but then suffered from a high amount of generated acoustic noise and/or suffered from having a low capacity measured in its ability to sort a given number of items per hour. Some systems suffer from a too high initial cost and/or a too high cost of maintaining the systems and/or do not provide numerous years of hassle free operation.

Thus, in order to solve such or other issues, it has been appreciated that an improved line sorter is of benefit, and in consequence, the present invention has been devised.

SUMMARY OF THE INVENTION

It may be seen as an object of the present invention to provide an improved line sorter. Preferably, the invention alleviates, mitigates or eliminates one or more of the above or other disadvantages singly or in any combination.

In particular, it may be seen as an object of the invention to provide a line sorter with a reduced need for energy input at a given sorting capacity.

Accordingly there is provided a line sorter for sorting items of various shapes, sizes and weights, such as postal parcels or airport baggage, the line sorter comprising
 an upper track section and a lower track section, where the upper section and the lower section are connected at end track sections, one end track section at each of two ends of the line sorter,
 at least one position dedicated induction of items onto the line sorter, such as by an induction,
 a plurality of discharges for sorting one or more items into their respective discharge,
 a closed loop chain comprising sorting carts or slats coupled at couplings and for moving the carts or slats along the upper track section, the lower track section and the end track sections, wherein the couplings enable the carts or slats to pivot relative to each other about a horizontal or substantially horizontal pivot axis when in operation,
 a linear synchronous motor propulsion system for moving said closed loop chain, the linear synchronous motor propulsion system comprising a stationary travelling field stator cooperating with a plurality of permanent magnets positioned on the carts or slats of the closed loop chain, wherein
 a first continuous row of permanent magnets is formed by the magnets of a row of carts or slats along the upper track section and a second continuous row of permanent magnets is formed by the magnets of a row of carts or slats along the lower track section, and wherein the plurality of permanent magnets on the carts or slats follows or substantially follows a curve form at the end track sections, wherein
 a gap between adjacent permanent magnets in the first and second continuous rows of permanent magnets is the same or substantially the same between each of the permanent magnets.

Thus, an improved line sorter is provided. An improvement may be seen to lie therein that when providing the line sorter with the given configuration, a reduced need for energy input is needed at a given sorting capacity or at a given moving speed of the carts or slats.

It is a general insight disclosed hereby, that with the disclosed configuration and possibly particularly when a gap between adjacent permanent magnets is as said herein, a reduced need for energy input is needed at a given moving speed of the carts or slats. Some reasons for this may be seen to be that with the described system fewer and/or more lightweight parts may be needed, e.g. in comparison with a line sorter system where the chain of carts or slats is moved by physical contact between a sprocket like device operably interacting using friction with the chain of carts. By the disclosed configuration, reliability is alternatively or additionally increased and an acoustic noise level at a given moving speed of the carts is alternatively or additionally reduced.

Possibly most importantly, by having the same gap between all of the magnets of the propulsion system, and e.g. not missing any magnets in the continuous rows of magnets, e.g. not missing one or more magnets at the couplings, the system is adapted to enable a high energy efficiency.

In order to further specify the gap, it is hereby specified that the gap is also the same or substantially the same between adjacent magnets at the couplings, and the gap is also the same or substantially the same between adjacent magnets of two individual carts or slats in the first and second continuous rows of permanent magnets.

According to embodiments of the invention, the gap between adjacent magnets in the first and second continuous rows of magnets is the same or substantially the same as a cart or slat gap between rigid ends of adjacent carts or slats. The carts or slats may overlap, however the cart or slat gap is then measured in the moving direction between ends of such overlapping rigid parts. The carts or slats may comprise flexible members, such as rubber members, to prevent items or parts of items of getting stuck between the carts or slats. Hence, the wording 'rigid ends'.

Given the insight provided herein, a coupling distance from a measurement line between centres of each track end section and to a pivot axis of a coupling can be chosen in dependence of one or more of I) a curve radius of the end track sections, II) a form or thickness of a permanent magnet, III) the gap between the permanent magnets and IV) a cart or slat pitch, so that a cart or slat gap between rigid ends of adjacent carts or slats remains greater than zero. When the cart or slat gap between rigid ends of adjacent carts or slats remains greater than zero, it is possible for the carts or slats to follow the radius of the curve form in the end track section without adjacent carts or slats hitting upon each other.

According to embodiments of the invention, a coupling distance from a measurement line between centres of each track end section and to a pivot axis of a coupling is maximally the same or substantially maximally the same as a distance from the measurement line and to an outer surface of a permanent magnet provided adjacent to the coupling. An advantage hereby may be seen to be further improvement of the energy efficiency and improved sturdiness of the line sorter, which then again, e.g., also reduces acoustic noise and improves reliability. Further, and since a curve radius of the end track section should be somewhat limited to limit height of the line sorter, such coupling distance would for the illustrated curve radius, with the illustrated magnet height and form and with the illustrated cart pitch, still just allow the carts to move through the end track sections without the permanent magnets of adjacent carts hitting each other.

According to a particularly advantageous embodiment in this respect, a coupling distance from the measurement line between centres of each track end section and to a pivot axis of a coupling is the same or substantially the same as a distance from the measurement line and to an inner surface of a permanent magnet provided adjacent to the coupling.

According to embodiments of the invention, each cart or slat comprises at least one coupling forming part of a pivotable connection between two adjacent carts or slats, and the coupling is positioned off-centre at a left and/or right side relatively to the first or second row of permanent magnets. Such construction enables a centred position of the stator. However, in preferred embodiments of the invention, each cart or slat comprises two or more couplings, each coupling forming part of a pivotable connection between two adjacent carts or slats, and at least one pivotable connection is provided at each of a left and right side relative to the first or second row of permanent magnets. An advantage may be seen to be that hereby a single centred stator configuration of the propulsion system can be provided that may be more reliable than having only one pivotable connection on each of a left or right side of the permanent magnets.

According to embodiments of the invention, a plurality of, or each of, the carts or slats comprises a set of rolling devices, such as a set of wheels, for operably interaction with the track, and wherein the rolling devices turn about an axis concentric with or substantially concentric with the pivot axis of the coupling of the cart or slat when in operation. An advantage hereby may be seen to be simplicity of the construction, and/or further improvement of the energy efficiency and/or further improved sturdiness of the line sorter.

According to embodiments of the invention, each cart or slat, or a plurality of carts or slats, in the chain of sorting carts or slats comprises one or more transport surfaces for receiving, transporting and/or discharging the items.

According to embodiments of the invention, the one or more transport surfaces comprises one or more cross-belts.

According to embodiments of the invention, the line sorter is provided in an over/under configuration. This may already be seen to be included in a definition of a line sorter.

According to embodiments of the invention, the at least one position dedicated induction of items onto the line sorter, is at the lower track section and/or the upper track section. Induction may be carried out manually, by one or more operators placing items on the sorter at such position(s) dedicated induction. Alternatively or additionally, items may be placed on the sorter utilising one or more robots. Alternatively or additionally, items may be placed on the sorter utilising an induction comprising a number of conveyor belts leading to the sorter.

Independent of the manner of inducting items, the at least one position dedicated induction of items onto the line sorter may alternatively or additionally be provided at an end track section, such as e.g. for placing the items on an item transport surfaces just after the surfaces has entered the upper track section.

According to embodiments of the invention, the plurality of discharges are provided along the lower track section and/or the upper track section. It may be seen as preferred to position the discharges at the upper track section.

The line sorter is particularly useful in an airport, a distribution centre, such as a postal distribution centre or in any other sorting facility, and particularly for sorting individual item pieces.

By referring to an advantage herein, it must be understood that this advantage may be seen as a possible advantage provided by the invention, but it may also be understood that the invention is particularly, but not exclusively, advantageous for obtaining the described advantage.

In general, the various aspects and advantages of the invention may be combined and coupled in any way possible within the scope of the invention.

These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
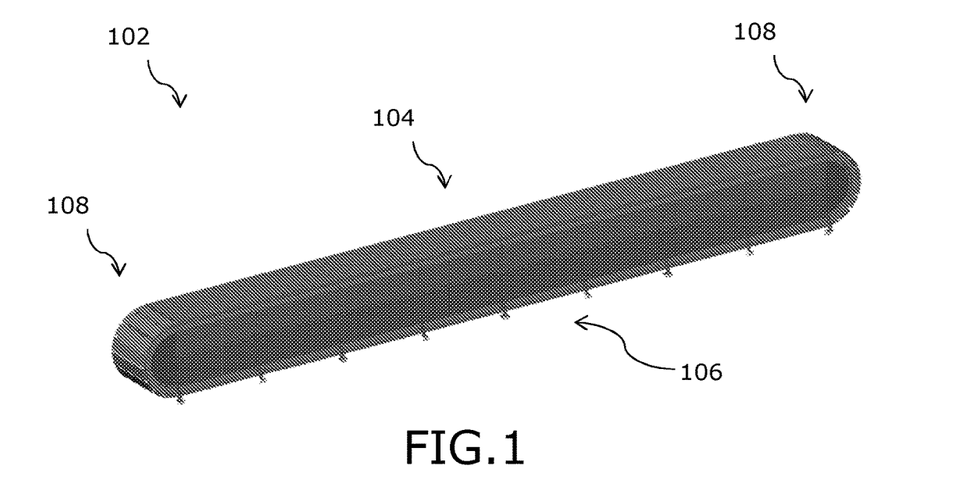
FIG. 1 shows a line sorter in a perspective view.

FIG. 1 shows a line sorter 102 in a perspective view. The figure does not show any inductions or discharges or other peripherals or parts of the system, such as a control system. The line sorter 102 is adapted for sorting items of various shapes, sizes and weights, such as postal parcels or airport baggage.

The line sorter includes an upper track section 104 and a lower track section 106. The upper section and the lower section are connected to, or otherwise operably positioned at, end track sections 108. There is one end track section at each of the two ends of the line sorter. At least one position at the lower track section and/or the upper track section is dedicated induction of items onto the line sorter 102, such as by an induction or conveyor (not shown). Although also not shown, a plurality of discharges or chutes is normally provided along the lower track section and/or the upper track section, and for sorting one or more items into their respective discharge. Due to the construction of the shown embodiment, such induction(s) and discharge(s) would be positioned for use at the upper track section only.

Figure 2:
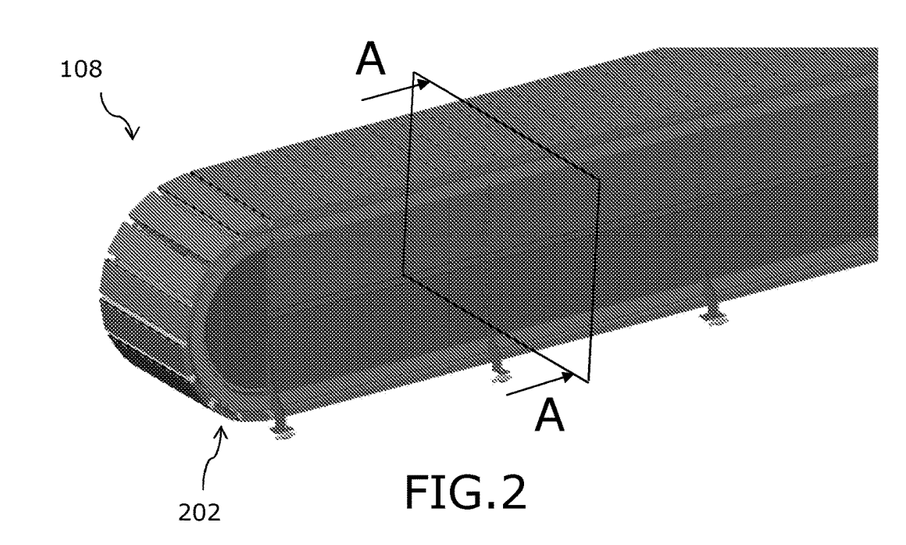
FIG. 2 is a close up of one end of the line sorter.

FIG. 2 is a close up of one track end 108 of the line sorter 102 shown in FIG. 1, and shows a curve form 202 of the end track section. A cross-sectional view direction A-A is indicated through the line sorter. It follows that the sorter is provided in an over/under configuration, i.e. where the upper track section is provided in line with, but directly above the lower track section, i.e. in a closed loop.

Figure 3:
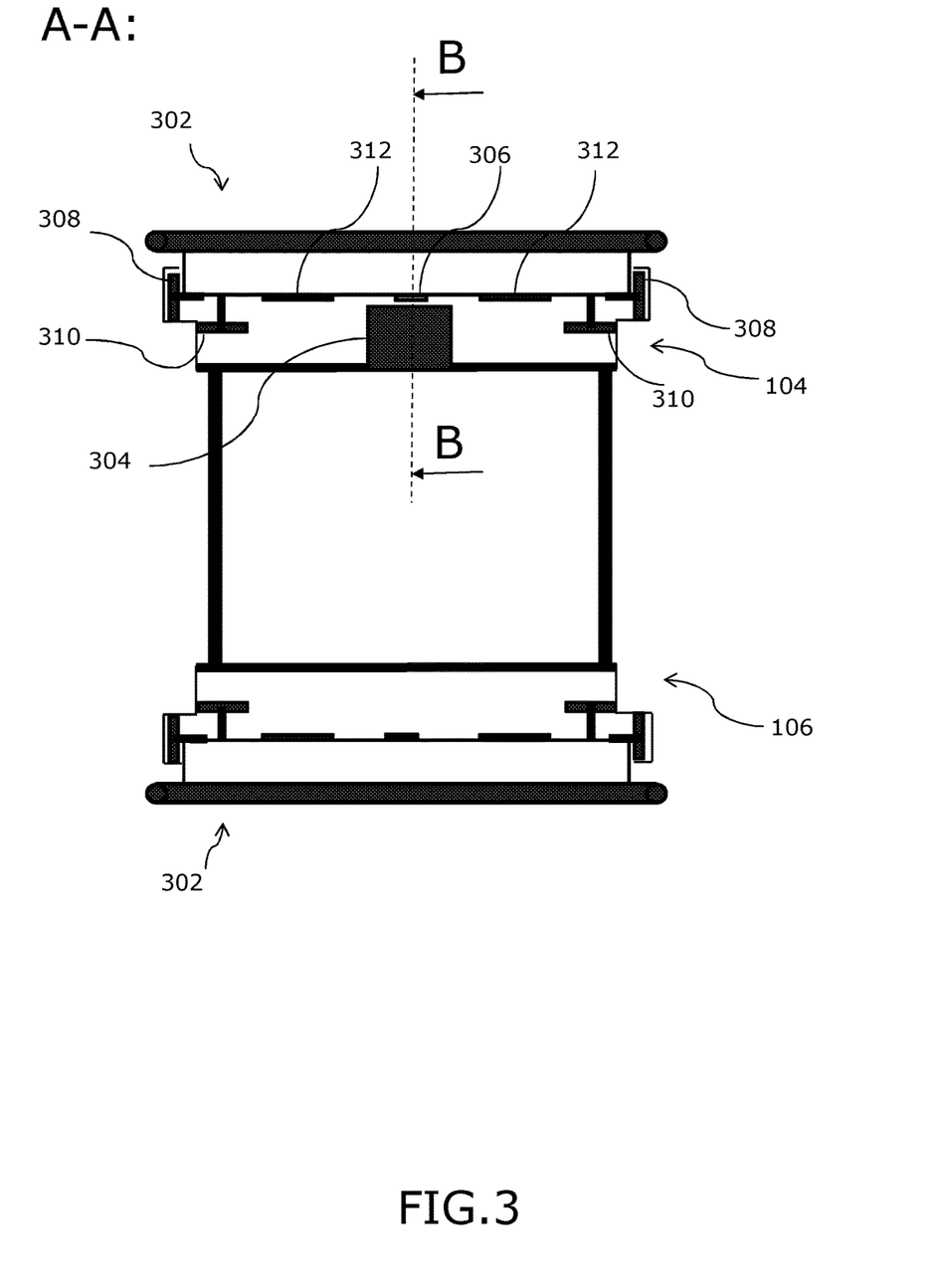
FIG. 3 is a cross-sectional view of the line sorter.

FIG. 3 is the cross-sectional view of the line sorter as indicated in FIG. 2, i.e. parallel with a moving direction of the carts or slats along the upper track section. The figure illustrates that a closed loop chain of the line sorter 102 comprises sorting carts or slats 302 coupled at couplings 312. The chain of carts 302, otherwise also referred to as slats or links, is provided for moving the carts or slats along the upper track section, the lower track section and the end track sections. The couplings 312 enable the carts or slats to pivot relative to each other about a horizontal or substantially horizontal pivot axis 404 when in operation.

Figure 4:
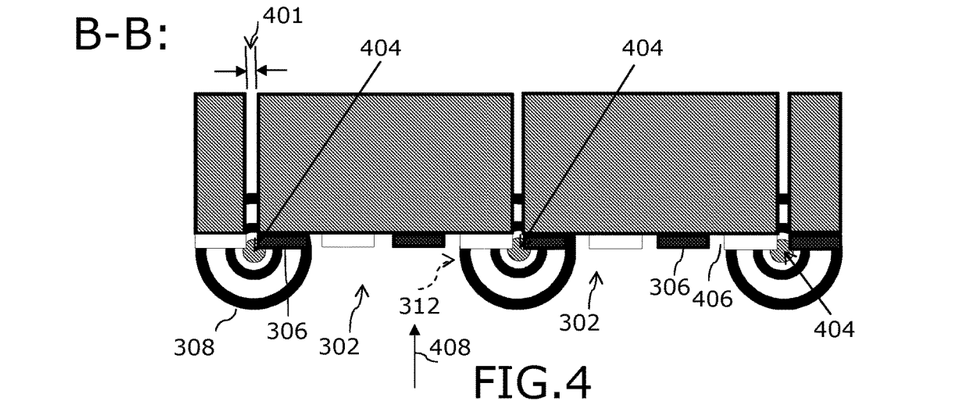
FIG. 4 is a cross-sectional view of a number of carts or slats of the line sorter.

There is also illustrated a linear synchronous motor propulsion system 304, 306 for moving said closed loop chain. The magnets 406 shown in FIG. 4, are also included in the linear synchronous motor propulsion system. The linear synchronous motor propulsion system includes a stationary travelling field stator 304 cooperating with a plurality of permanent magnets 306, 406 positioned on the closed loop chain. Rolling devices 308, illustrated as wheels, are shown towards each side of the cart 302. These wheels are provided for enabling movement of the carts along the closed track including the track sections 104, 106, 108 and for controlling position of the carts, mainly in the vertical direction. Likewise, rolling devices 310 are illustrated and provided for controlling position of the carts in the horizontal direction.

FIG. 4 is a cross-sectional view of a number of carts or slats of the line sorter 102 along the line B-B and in the direction as indicated in FIG. 3. Two carts 302 and the end or start of two further carts are shown. The carts are coupled to adjacent carts by couplings 312. The couplings 312 cannot be seen in detail, however the reference arrows 312 point to their approximate position.

The couplings 312 enable the carts to pivot relative to each other around the pivot axis 404, in particular, or moreover, when the carts follow or substantially follow the curve form of the end track sections. The stator 304 and the wheels 310 are for simplicity not shown in FIG. 4. However, it is shown that each cart comprises four magnets, but each or at least a plurality of the carts may have any number of magnets 306, 406, such as one, two, three, four, five, six, seven, eight, nine, 10, 11, 12 or more magnets in dependence of the chosen configuration. Preferably, each cart or link comprises a plurality of permanent magnets. As seen in the figures herein, the plurality of permanent magnets are positioned after each other in the moving direction of the carts, links or slats as a row of magnets. The magnets are shown with a constant pitch and alternating polarity. Preferably a single row of magnets is provided as illustrated herein.

The magnets are permanent magnets, and illustrating every second magnet in black and every second magnet in white symbolizes that each magnet has alternating polarity relative to the next. Thus, this illustrates that e.g. the white magnets 406 have a north pole facing towards the transport surface of the cart and a south pole facing the other direction, whereas this is the opposite for the black magnets 306. Thus, the plurality of permanent magnets is arranged with alternating polarity to cooperate with the magnetic field provided by the stator.

It can further be seen, that in the shown embodiment the plurality of permanent magnets is arranged with the same pitch or substantially the same pitch between them. Thus, it may be seen to be preferred that the permanent magnets have the same dimensions, at least in the length direction of the magnets, i.e. in a moving direction of the carts or slats along the upper or lower track sections.

It can further be seen that the plurality of permanent magnets is arranged so that a magnet configuration and positioning on each cart is identical or substantially identical from cart to cart. The arrow 408 is the view direction of the illustration in FIG. 8.

Figure 7:
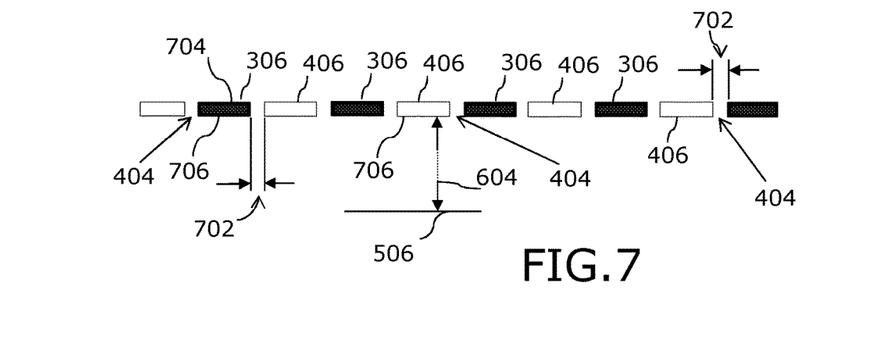
FIG. 7 is a view solely of the permanent magnets in a configuration as they have when installed on the carts in FIG. 4.

It is illustrated that the gap, see 702 in FIG. 7, between adjacent magnets in the rows of permanent magnets is the same or substantially the same as a cart or link gap 401 between rigid ends of adjacent carts or slats. In the illustrated embodiment, rigid parts, other than parts of the couplings, of the carts or slats do not overlap.

Figure 5:
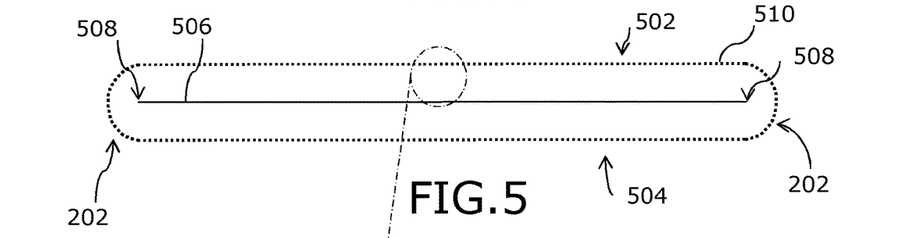
FIG. 5 is an illustration of a loop of permanent magnets in the line sorter.

In FIG. 5 it is illustrated that the magnets of the carts form a first continuous row 502 of magnets along the upper track section. Further, it is illustrated that a second continuous row 504 of magnets is formed at the lower track section, and that the plurality of magnets on the carts or slats follows or substantially follows the curve form 202 of the end track sections. Thus, it follows that the plurality of magnets forms a loop 510 of magnets all along the line sorter. Each dot in the loop 510 illustrates a permanent magnet 306, 406. There is also illustrated a measurement line 506 between centres 508 of each track end section.

Figure 6:
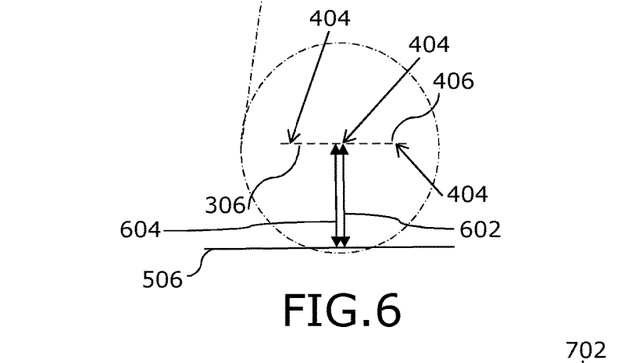
FIG. 6 illustrates an enlarged view of a number of permanent magnets along a row of permanent magnets in the loop of magnets in FIG. 5.

FIG. 6 is an enlarged view of the loop within the circle as indicated in FIG. 5. Here it can be seen that a coupling distance 602 from the measurement line 506, and to a pivot axis 404 of a coupling 312 is the same or substantially the same as a distance 604 from the measurement line and to an inner surface 706 (see FIG. 7) of a permanent magnet provided adjacent to the coupling.

FIG. 7 illustrates that a gap 702 between adjacent magnets in the first and second continuous rows of magnets is the same or substantially the same between each of the magnets, also at the couplings with the pivot axis 404, and also between adjacent magnets of two individual carts or slats 302 in the first and second continuous rows 502, 504 of permanent magnets.

Figure 8:
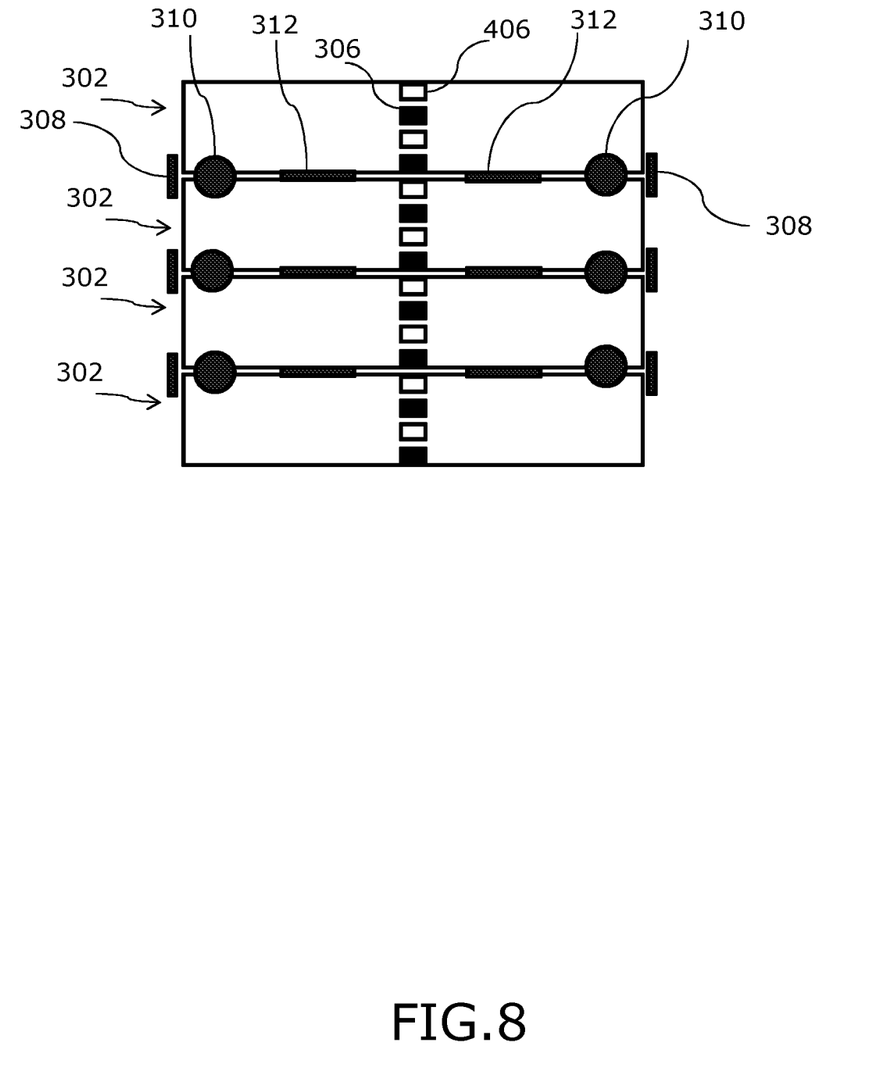
FIG. 8 is a view from below a number of carts in the track section and as indicated with the view direction 408 in FIG. 4.

FIG. 8 is a view in the direction of the arrow 408 in FIG. 4. It is illustrated that the couplings 312 each comprises at least two separate pivotable connections, at least one pivotable connection provided at each of a left and right side relative to the row of permanent magnets. The separate magnets 306, 406 are visible for illustration purposes, although in practice the magnets may be provided with and possibly hidden behind protection or otherwise encapsulated. The magnets are positioned in a centre of the cart or slat, so as to be positioned above a centre of the stator.

Figure 9:
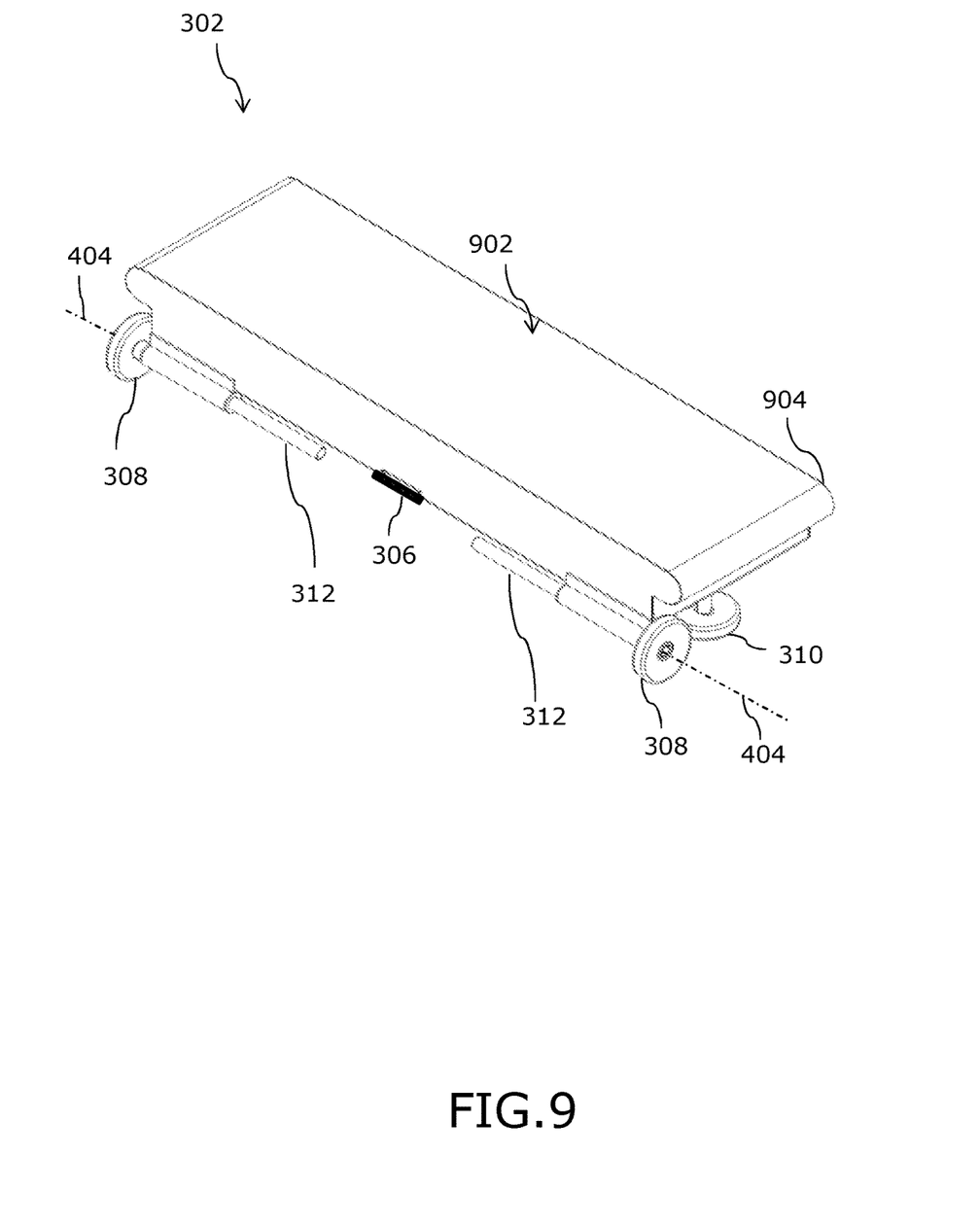
FIG. 9 is a perspective view of a single cart or slat of the line sorter.

FIG. 9 is a perspective view of a single cart 302 and it follows that this cart includes a transport surface 902 for receiving, transporting and/or discharging the items. The figure discloses that the transport surface is a cross-belt 904, i.e. a conveyor belt capable of receiving and/or discharging one or more items positioned on the belt in a crosswise direction relative to a moving direction of the cart in the upper or lower track sections. The wheels 308 and 310 are also shown, as well as the pivot axis 404 of the couplings 312.

It follows that the set of wheels 308 are provided for turning about an axis concentric with or substantially concentric with the pivot axis 404 of the coupling of the cart or slat. In the illustrated embodiment, an axle of the wheels 308 is the same axis as one part of the coupling 312. The part of the coupling illustrated in FIG. 9 is to be operably coupled with another part of the coupling fitted to it and positioned on the adjacent cart or slat (not shown).

In short, it is herein disclosed that the invention relates to a line sorter 102 for sorting items of various shapes, sizes and weights, in particular postal parcels or airport baggage. The invention is particularly related to the propulsion system 304, 306, 406 for the sorter. It may be seen as an object of the invention to provide a line sorter with a reduced need for energy input at a given sorting capacity. It is disclosed that a closed loop chain including sorting carts or slats 302 is provided with couplings 312 and is provided for moving along line sorter track sections. The linear synchronous motor propulsion system is provided for moving said closed loop chain, and a gap 702 between adjacent permanent magnets 306, 406 is the same or substantially the same between each of the permanent magnets.

Although the present invention has been described in connection with preferred embodiments, it is not intended to be limited to the specific form set forth herein. Rather, the scope of the present invention is limited only by the accompanying claims.

In this section, certain specific details of the disclosed embodiment are set forth for purposes of explanation rather than limitation, so as to provide a clear and thorough understanding of the present invention. However, it should be understood readily by those skilled in this art, that the present invention may be practised in other embodiments which do not conform exactly to the details set forth herein, without departing significantly from the scope of this disclosure. Further, in this context, and for the purposes of brevity and clarity, detailed descriptions of well-known apparatus, circuits and methodology have been omitted so as to avoid unnecessary detail and possible confusion.

In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Reference signs are included in the claims however the inclusion of the reference signs is only for clarity reasons and should not be construed as limiting the scope of the claims.

The invention claimed is:

1. A line sorter for sorting items of various shapes, sizes and weights, the line sorter comprising
    an upper track section and a lower track section, where the upper track section is provided in line with, but directly above the lower track section, and where the upper section and the lower section are connected at end track sections, one end track section at each of two ends of the line sorter,
    at least one position dedicated induction of items onto the line sorter,
    a plurality of discharges for sorting one or more items into their respective discharge,
    a closed loop chain comprising sorting carts or slats coupled at couplings and for moving the carts or slats along the upper track section, the lower track section and the end track sections, wherein the couplings are configured to enable the carts or slats to pivot relative to each other about a horizontal or substantially horizontal pivot axis when in operation,
    a linear synchronous motor propulsion system for moving said closed loop chain, the linear synchronous motor propulsion system comprising a stationary travelling field stator cooperating with a plurality of permanent magnets positioned on the carts or slats of the closed loop chain, wherein
    a first continuous row of said plurality of permanent magnets is formed by the magnets of a row of carts or slats along the upper track section and a second continuous row of said plurality of permanent magnets is formed by the magnets of a row of carts or slats along the lower track section, and wherein the plurality of permanent magnets on the carts or slats follows or substantially follows a curve form at the end track sections, wherein
    a gap between adjacent magnets in the first and second continuous rows of magnets is the same or substantially the same between each of the magnets, wherein the gap between adjacent magnets in the first and second continuous rows of magnets is the same or substantially the same as a cart or slat gap between rigid ends of adjacent carts or slats.

2. The line sorter according to claim 1, wherein the gap is also the same or substantially the same between adjacent magnets at the couplings.

3. The line sorter according to claim 1, wherein the gap is also the same or substantially the same between adjacent magnets of two individual carts or slats in the first and second continuous rows of permanent magnets.

4. The line sorter according to claim 1, wherein a coupling distance from a measurement line between centres of each track end section and to a pivot axis of a coupling is chosen in dependence of one or more of I) a curve radius of the end track sections, II) a form or thickness of a permanent magnet, III) the gap between the permanent magnets and IV) a cart or slat pitch, so that a cart or slat gap between rigid ends of adjacent carts or slats remains greater than zero.

5. The line sorter according to claim 1, wherein each cart or slat comprises at least one coupling forming part of a pivotable connection between two adjacent carts or slats, where the coupling is positioned off-center at a left or right side relatively to the first or second row of permanent magnets.

6. The line sorter according to claim 1, wherein each cart or slat comprises two or more couplings, each coupling forming part of a pivotable connection between two adjacent carts or slats, where at least one pivotable connection is provided at each of a left and right side relative to the first or second row of permanent magnets.

7. The line sorter according to claim 1, wherein a plurality of, or each, of the carts or slats comprises a set of rolling devices for operably interaction with the track, and wherein the rolling devices turn about an axis concentric with or substantially concentric with the pivot axis of the coupling of the cart or slat when in operation.

8. The line sorter according to claim 1, wherein a plurality of, or each, cart or slat in the chain of sorting carts or slats comprises one or more transport surfaces for receiving, transporting and/or discharging the items.

9. The line sorter according to claim 8, wherein the one or more transport surfaces comprises one or more cross-belts.

10. The line sorter according to claim 1, wherein the line sorter is provided in an over/under configuration.

11. The line sorter according to claim 1, where the at least one position dedicated induction of items onto the line sorter, is at the lower track section and/or the upper track section.

12. The line sorter according to claim 1, where the at least one position dedicated induction of items onto the line sorter, is provided at an end track section.

13. The line sorter according to claim 1, where the plurality of discharges are provided along the lower track section and/or the upper track section.

14. A method of sorting said items using the line sorter according to claim 1, said method comprising:
   a) loading or inducting said items onto the line sorter at said at least one position dedicated induction of items, and
   b) sorting said items respectively into one or more of said plurality of discharges.

15. A method according to claim 14, wherein said method is performed in a distribution centre or in another sorting facility.

16. A line sorter for sorting items of various shapes, sizes and weights, the line sorter comprising
   an upper track section and a lower track section, where the upper track section is provided in line with, but directly above the lower track section, and where the upper section and the lower section are connected at end track sections, one end track section at each of two ends of the line sorter,
   at least one position dedicated induction of items onto the line sorter,
   a plurality of discharges for sorting one or more items into their respective discharge,
   a closed loop chain comprising sorting carts or slats coupled at couplings and for moving the carts or slats along the upper track section, the lower track section and the end track sections, wherein the couplings are configured to enable the carts or slats to pivot relative to each other about a horizontal or substantially horizontal pivot axis when in operation,
   a linear synchronous motor propulsion system for moving said closed loop chain, the linear synchronous motor propulsion system comprising a stationary travelling field stator cooperating with a plurality of permanent magnets positioned on the carts or slats of the closed loop chain, wherein
   a first continuous row of said plurality of permanent magnets is formed by the magnets of a row of carts or slats along the upper track section and a second continuous row of said plurality of permanent magnets is formed by the magnets of a row of carts or slats along the lower track section, and wherein the plurality of permanent magnets on the carts or slats follows or substantially follows a curve form at the end track sections, wherein
   a gap between adjacent magnets in the first and second continuous rows of magnets is the same or substantially the same between each of the magnets
   wherein a coupling distance from a measurement line between centres of each track end section and to a pivot axis of a coupling is maximally the same or substantially maximally the same as a distance from the measurement line and to an outer surface of a magnet provided adjacent to the coupling.

17. A line sorter for sorting items of various shapes, sizes and weights, the line sorter comprising
   an upper track section and a lower track section, where the upper track section is provided in line with, but directly above the lower track section, and where the upper section and the lower section are connected at end track sections, one end track section at each of two ends of the line sorter,
   at least one position dedicated induction of items onto the line sorter,
   a plurality of discharges for sorting one or more items into their respective discharge,
   a closed loop chain comprising sorting carts or slats coupled at couplings and for moving the carts or slats along the upper track section, the lower track section and the end track sections, wherein the couplings are configured to enable the carts or slats to pivot relative to each other about a horizontal or substantially horizontal pivot axis when in operation,
   a linear synchronous motor propulsion system for moving said closed loop chain, the linear synchronous motor propulsion system comprising a stationary travelling field stator cooperating with a plurality of permanent magnets positioned on the carts or slats of the closed loop chain, wherein
   a first continuous row of said plurality of permanent magnets is formed by the magnets of a row of carts or slats along the upper track section and a second continuous row of said plurality of permanent magnets is formed by the magnets of a row of carts or slats along the lower track section, and wherein the plurality of permanent magnets on the carts or slats follows or substantially follows a curve form at the end track sections, wherein
   a gap between adjacent magnets in the first and second continuous rows of magnets is the same or substantially the same between each of the magnets
   wherein a coupling distance from a measurement line between centres of each track end section and to a pivot axis of a coupling is the same or substantially the same as a distance from the measurement line and to an inner surface of a permanent magnet provided adjacent to the coupling.

* * * * *